(12) United States Patent
Sanchez Herrero et al.

(10) Patent No.: US 10,169,399 B2
(45) Date of Patent: Jan. 1, 2019

(54) FLEXIBLE PROFILE GROUPING DOWNLOAD

(71) Applicant: Telefonaktiebolaget L M Ericsson (publ), Stockholm (SE)

(72) Inventors: Juan Antonio Sanchez Herrero, Madrid (ES); Maria Esther Bas Sanchez, Madrid (ES); Maria Cruz Bartolomé Rodrigo, Madrid (ES)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 610 days.

(21) Appl. No.: 14/649,844

(22) PCT Filed: Feb. 20, 2013

(86) PCT No.: PCT/EP2013/053374
§ 371 (c)(1),
(2) Date: Jun. 4, 2015

(87) PCT Pub. No.: WO2014/086500
PCT Pub. Date: Jun. 12, 2014

(65) Prior Publication Data
US 2015/0302048 A1 Oct. 22, 2015

Related U.S. Application Data

(60) Provisional application No. 61/733,165, filed on Dec. 4, 2012.

(51) Int. Cl.
*G06F 7/00* (2006.01)
*G06F 17/00* (2006.01)
(Continued)

(52) U.S. Cl.
CPC .. *G06F 17/30377* (2013.01); *G06F 17/30604* (2013.01); *H04W 4/70* (2018.02); *H04W 8/186* (2013.01); *H04W 8/20* (2013.01)

(58) Field of Classification Search
None
See application file for complete search history.

(56) References Cited

U.S. PATENT DOCUMENTS

2002/0138340 A1* 9/2002 Ikezawa ............ G06Q 10/06311
705/7.15

FOREIGN PATENT DOCUMENTS

EP 2 421 326 A1 2/2012
EP 2 523 503 A1 11/2012
(Continued)

OTHER PUBLICATIONS

International Search Report and Written Opinion of the International Searching Authority, PCT Application No. PCT/EP2013/053374, dated Jul. 19, 2013.
(Continued)

*Primary Examiner* — James Trujillo
*Assistant Examiner* — John J Morris
(74) *Attorney, Agent, or Firm* — Sage Patent Group

(57) ABSTRACT

A method for providing of data is provided, the method comprising at a first database: providing of group data; providing of data of a first entity, in particular of a first device, the data of the first entity comprising the group data; receiving from a second database a request for the data of the first entity; determining that the data of the first entity comprises the group data and that said group data has not been sent to the second database before; and if said determining step is in the affirmative, sending the data of the first entity comprising the group data to the second database.

21 Claims, 7 Drawing Sheets

(51) Int. Cl.
*G06F 17/30* (2006.01)
*H04W 4/70* (2018.01)
*H04W 8/18* (2009.01)
*H04W 8/20* (2009.01)

(56) References Cited

FOREIGN PATENT DOCUMENTS

WO    WO 2011/089464 A1    7/2011
WO    WO 2011089464 A1 *    7/2011  ............ H04W 8/186

OTHER PUBLICATIONS

3GPP TR 23.887 V0.6.0 (Dec. 2012) $3^{rd}$ Generation Partnership Project; Technical Specification Group Services and System Aspects; Machine-Type and other Mobile Data Applications Commuications Enhancements(Release 12), 650 Route des Lucioles, Sophia Antipolis, Valbonne, France; 95 pages.

* cited by examiner

FLEXIBLE PROFILE GROUPING DOWNLOAD

CROSS REFERENCE TO RELATED APPLICATIONS

This application is a 35 U.S.C. § 371 national stage application of PCT International Application No. PCT/EP2013/053374, filed on 20 Feb. 2013, which itself claims priority to U.S. provisional Application No. 61/733,165, filed 4 Dec. 2012, the disclosure and content of both of which are incorporated by reference herein in their entirety. The above-referenced PCT International Application was published in the English language as International Publication No. WO 2014/086500A1 on 12 Jun. 2014.

TECHNICAL FIELD

The invention relates to databases and methods for providing data. In particular, the invention relates to databases and methods enabling flexible profile grouping download. Furthermore, the invention relates to a system, program elements and a computer-readable medium.

BACKGROUND

In the field of data communication or providing data, in particular in mobile networks, different ways for handling or providing great amounts of data or to provide the same data to different devices are known. The provision of data includes transferring of data from one device to another device. In order to reduce the amount of data to be transferred or communicated to provide a given amount of payload data to the devices several ways like grouping of the devices are known.

For example so called Machine Type Communication (MTC) Groups are known. MTC applications generally involve a group of devices. Typically applications today involve more than 1000 subscriptions for a single customer. From both customer and operator points of view, there is benefit in optimised handling of groups of MTC devices.

One possibility belongs to $3^{rd}$ Generation Partnership Project (3GPP) MTC, see for example 3GPP TR 23.887 v0.5.0 dated 28 Nov. 2012. In particular, 3GPP SA2 is studying different solutions to optimize the network by grouping devices for the following key issues:

Group based Messaging: to efficiently distribute the same message (e.g. a trigger request) to those members of an MTC group that are located in a particular geographical area on request of the Service Capability Server (SCS).

Group based Charging: In many cases, the data volume of CDRs generated by MTC applications is greater than the volume of actual user data transmitted. In these cases it may be beneficial to create bulk CDRs to count chargeable events per group instead of CDR creation per individual device.

Group based Policing: to enforce a policy for a group of MTC devices. This allows greater flexibility to the MTC application or MTC application owner compared to individual policies for each of the devices, while at the same time ensuring the operator that the particular group of MTC devices does not unduly load the network.

Group based identifying and addressing: essential to support group based features such as messaging, charging and policing.

Furthermore Profile Grouping is known. In particular, there will be groups of MTC devices that will typically have subscribed the same service profile or at least a common set of services.

However, several problems are linked with existing solutions. One of the most challenging issues for companies operating cellular networks is the overload of its networks due to the drastic increase of signaling due to MTC devices. Besides, the ratio between network signaling (that is usually not billed) and network payload (that can be billed) could decrease a lot for certain types of devices.

Profile grouping in central databases can optimize provisioning and storage resources in the central database, but when populating such profiles to other local databases in the network will mean massive procedures.

For example, all of a group of fire alarms spread in a wood connected to the central alarm system through a GPRS/LTE wireless connection may have the same 3GPP data profile. All of them are connected to the same SGSN/MME. When these 2000 devices are attached, 2000 Location Updating are needed where the same profile is downloaded 2000 times. Besides, if after sometime the profile changes for the whole group (for example the alarm system decides to change the power saving profile due to a heat wave) 2000 thousand messages need to be sent to the same SGSN/MME with the same data change.

SUMMARY

It is an object of the invention to provide databases and methods for providing data which at least overcome some of the above mentioned problems.

In order to achieve the object defined above, a database, a method for providing data, a system, program elements and a computer readable medium according to the independent claims are provided.

According to an exemplary aspect a method for providing of data is provided, the method comprising at a first database: providing of group data; providing of data of a first entity, in particular of a first device, the data of the first entity comprising the group data; receiving from a second database a request for the data of the first entity; determining that the data of the first entity comprises the group data and that said group data has not been sent to the second database before; and if said determining step is in the affirmative, sending the data of the first entity comprising the group data to the second database.

In particular, the first database may be a central database, e.g. a Home Subscriber Server (HSS). For example, the group data may be provided from a provisioning system or stored by any other means at the first database. In particular, the data for the first entity, e.g. a first device, a first subscriber or a first subscription, may be provided from a provisioning system or stored by any other means at the first database. In general, the term entity may particular refer to a device, a subscriber, a subscription, or the like. For example, the second database may be a local database such as Mobile Switching Center (MSC), or Serving GPRS Support Node (SGSN), Mobile Management Entity (MME), or the like.

According to an exemplary aspect a method for providing of data, the method comprising at a second database: sending to a first database a request for data of a first entity; receiving from the first database the data of the first entity comprising group data; storing the data of the first entity comprising the group data: sending to the first database a request for data of a second entity; receiving from the first database the data of the second entity without the group data; and storing the data of the second entity comprising the group data as obtained from the received data of the first entity.

In particular, the second database may be a local database such as MSC or SGSN or MME or the like, while the first database may be a central database such as an HSS or the like. For example, the request for data of a first entity might be triggered by reception of a first service access for a first entity, e.g. a first device, subscriber, subscription or the like, at the second database. In particular, the group data may be contained in a stored data set or linked to it, the latter may be useful if the group data has a large size. For example, the request for data of a second entity, e.g. device, subscriber, subscription or the like, might be triggered by reception of a second service access for a second entity at the second database. In particular, the group data may be contained in a stored data set or linked to it, the latter being useful if the group data has a large size.

According to an exemplary aspect a first database is provided which is adapted to perform the method according to an exemplary aspect.

According to an exemplary aspect a first database is provided wherein the first database comprises a receiving unit, a transmission unit, a processing unit, and a storage unit, wherein the storage unit is adapted to store group data and data of a first entity, in particular a first device, the data of the first entity comprising the group data; wherein the receiving unit is adapted to receive from a second database a request for the data of the first entity; and wherein the processing unit is adapted to determine that the data of the first entity comprises the group data and that said group data has not been sent to the second database before and if said determining step is in the affirmative being adapted to initiate a sending via the transmission unit of the data of the first entity comprising the group data to the second database.

According to an exemplary aspect a second database is provided which is adapted to perform the method according to an exemplary aspect.

According to an exemplary aspect a second database is provided wherein the second database comprises a receiving unit, a transmission unit, a processing unit, and a storage unit, wherein the transmission unit is adapted to send to a first database a request for data of a first entity, in particular of a first device; the receiving unit is adapted to receive from the first database the data of the first entity comprising group data; the storage unit is adapted to store the data of the first entity comprising the group data; the transmission unit is adapted to send to the first database a request for data of a second entity, in particular a second device; the receiving unit is adapted to receive from the first database the data of the second entity without the group data; and the storage unit is adapted to store the data of the second entity comprising the group data as obtained from the received data of the first entity.

In particular, the group data may be obtained by the processing unit. For example, the group data may be contained in a stored data set or linked to it, the latter being useful if the group data has a large size.

According to an exemplary aspect a system, in particular a system for a (mobile) communication network, is provided wherein the system comprises a first database according to an exemplary aspect and a second database according to an exemplary aspect.

According to another exemplary aspect, a program element (for instance a software routine, in source code or in executable code) is provided, which, when being executed by a processor, is adapted to control or carry out a method according to an exemplary aspect having the above mentioned features.

According to yet another exemplary aspect, a computer-readable medium (for instance a CD, a DVD, a USB stick, a floppy disk or a hard disk) is provided, in which a computer program is stored which, when being executed by a processor, is adapted to control or carry out a method according to an exemplary aspect having the above mentioned features.

A gist of an exemplary aspect may relate to a mechanism adapted to populate device data profiles in a network in an efficient manner by grouping such data profiles. The mechanism may permit that the profile grouping is flexible so local databases do not need to be pre-configured with predefined group data, but this data may be defined flexibly (e.g. not pre-agreed or standardized) and it may be dynamically configured in the local databases when it is needed. Alternatively or in addition, it may be possible that group data, e.g. data relating or associated with all entities of one group or to the configuration of the entities of one group, may only be sent once so that the amount of data to be transferred may be reduced.

The aspects defined above and further aspects are apparent from the examples of embodiment to be described hereinafter and are explained with reference to these examples of embodiment.

BRIEF DESCRIPTION OF THE DRAWINGS

In the following, embodiments of the invention are described in more detail hereinafter with reference to examples but to which the scope is not limited.

DETAILED DESCRIPTION

In the context of this application, the term "group data" may particularly denote data which is common to a group and/or characterizing a group, e.g. a group of devices, subscriber, subscription or the like.

The term "identifier" may particularly denote data or information identifying or defining a specific entity and/or characteristic of an entity. For example, an identifier may identify the belonging to a group denoted e.g. as "group A". In particular, such an identifier may be used to identify the belonging of a specific entity to a specific group.

The term "entity" may particularly denote any entity, node, element, or even person being part, user, or provider, or the like of a communication network. For example, an entity may be a device, a subscriber or subscription. The terminology data of an entity or entity data may refer to data of a device (e.g. of a first or second device or group data comprised in device data). However, this does not exclude that the data of an entity can be equivalently regarded as related to a subscription or a subscriber. Hence, data of a device or a subscriber or a subscription can be equivalently used to identify or relate data to an entity in a communication system, the entity being e.g. a device, a subscriber, or a subscription. So, "device data" or "data of a device" in the examples and embodiments herein might be generalized by "entity data" or "data of an entity". In that sense "group data common to a group of devices" might be "group data common to a group of entities" and "device-specific data" might be "entity-specific data".

In the following, with referring to FIGS. 7 and 8, the principle steps of two methods according to exemplary aspects are described. It should be noted that the steps described in the context of FIGS. 7 and 8 are not necessarily performed in the described order but may be shifted.

Figure 7:
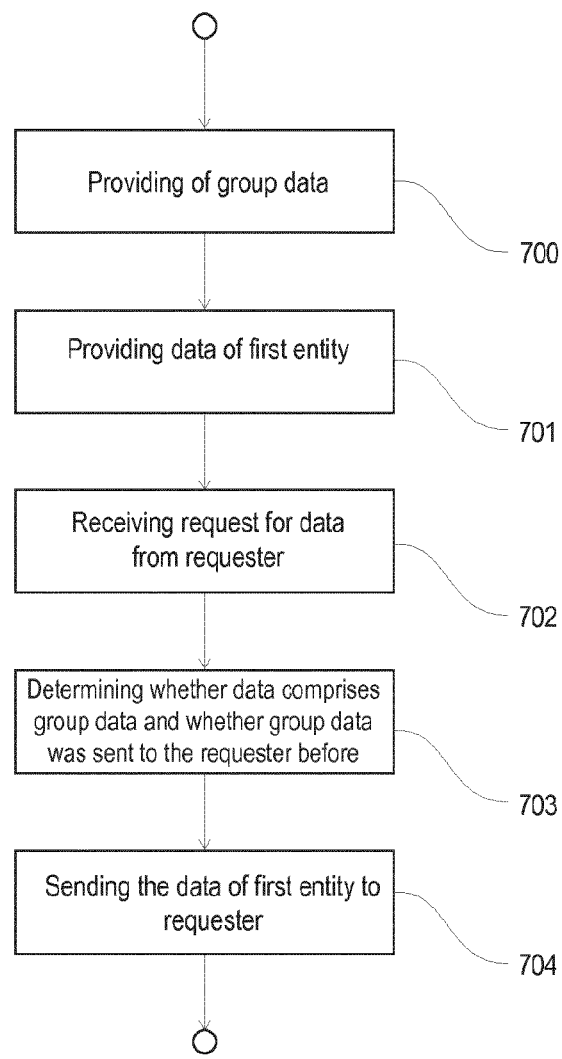
FIG. 7 schematically illustrate a flowchart for a method according to an exemplary embodiment performed at a first or central database.

In particular, FIG. 7 describes a method which may be performed by a first database of a system, e.g. a system for a (mobile) communication network.

In a first step (step 700), group data are provided and optionally stored at the first database, e.g. a central database. Additionally, data of a first entity, e.g. of a first device, are provided and preferably stored at the first database, wherein the data of the first entity comprises the group data (step 701). In the following, the first database receives a request for the data of the first entity from a second database, e.g. a local database (step 702). Upon the request the first database determines whether/that the data of the first entity comprises the group data and that said group data has not sent to the second database (step 703). In case the determining step is positive or affirmative the data of the first entity which comprises the group data is sent to the second database (step 704).

Figure 8:
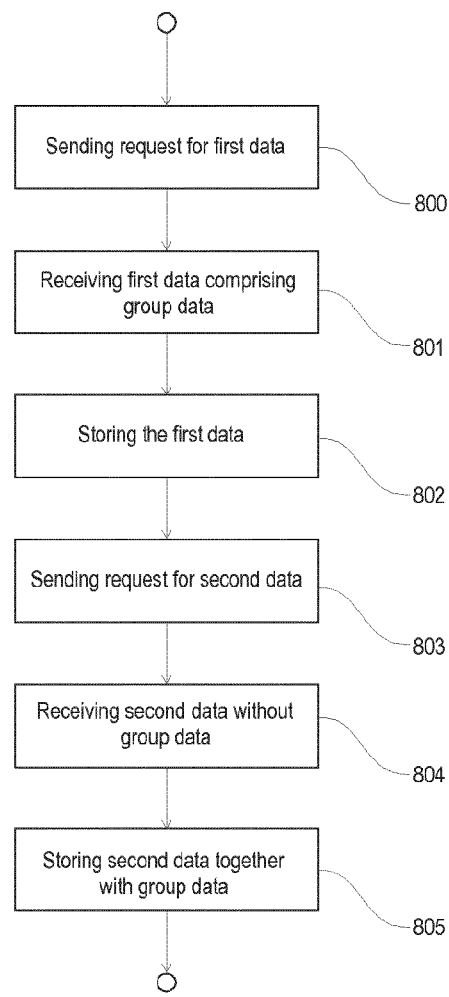
FIG. 8 schematically illustrate a flowchart for a method according to an exemplary embodiment performed at a second or local database.

In particular, FIG. 8 describes a method which may be performed by a second database, e.g. a local database, of a system, e.g. a system for a (mobile) communication network.

In a first step (step 800), the second database sends a request for data of a first entity to a first database, e.g. a central database. Thereupon the second database receives from the first database the data of the first entity, which data comprises group data (step 801). Then the second database stores the received data of the first entity which data comprises the group data (step 802). Afterwards the second database sends a request for data of a second entity to the first database (step 803), whereupon the second database receives the data of the second entity without the group data from the database (step 804). Then the second database stores the data of the second entity comprising the group data as obtained from the received data of the first entity (step 805)

A method according to the embodiments described in the context of FIG. 7 and FIG. 8 may enable a mechanism adapted to populate device data profiles in a network in an efficient manner by grouping such data profiles which may enable a flexible grouping where local databases do not need to be pre-configured with predefined group data.

A first database, e.g. a central database, where entity data, e.g. device data, may be permanently stored is provisioned with group data corresponding to a group of entities, e.g. devices, and with individual data for such entities, e.g. devices.

When a second database, e.g. a local database, temporally needs profile data for one entity, e.g. a device, the central database can download the whole profile data for such entity, e.g. a device, both the profile data corresponding to the group the entity, e.g. device, belongs to and individual data if any. The second or local database can now be populated with the profile data for this group, apart from the individual entity data.

Next time that this second or local database needs profile data for another entity, e.g. device, of the same group, the first or central database can recognize that the "another entity (e.g. device)" belongs to the same group as the "one entity (device)" mentioned above belongs to. As a consequence, only the group identity may be downloaded to said second or local database (to indicate the belonging of the "another entity (e.g. device)" to the same group as for the "one entity (e.g. device)" such that the second or local database is able to use the group profile data downloaded for the "one entity (e.g. device)" also for the "another entity (e.g. device)"), together with individual data specific for such entity, e.g. device) if any. So, group data does not need to be downloaded again.

If any group data is changed later on, there is no need for massive update of local databases, only one message per local data base may be needed to inform about the change.

This may be a great save of signaling resources when grouping high amount of entities, e.g. devices, with the same or similar profile data that access the same serving node. In particular, the databases and methods may facilitate efficient provision of data, for example of a mobile network.

Next, further exemplary embodiments of the methods for providing of data are described. However, these embodiments also apply to a local or second database, to a central or first database, a system, program elements, and to a computer readable medium.

According to an exemplary embodiment the method further comprises providing of data of a second entity, in particular of a second device, the data of the second entity comprising the group data; receiving from the second database a request for the data of the second entity; determining that the data of the second entity comprises the group data and that said group data has been sent to the second database before; and if said determining step is in the affirmative, sending the data of the second entity without the group data to the second database.

In particular, the data for the second entity, e.g. a second device, a second subscriber or a second subscription, may be provided from a provisioning system or stored by any other means at the first database. For example, the second database may be a local database such as MSC or SGSN or MME or the like.

According to an exemplary embodiment of the method the group data is identified by a group data identifier and said sending of the data of the second entity without the group data to the second database comprises the group data identifier.

The usage of a group data identifier for identifying the belonging of specific data and/or entity to a specific group may provide an efficient way, in particular a way needing only a small amount of data, to define groups.

According to an exemplary embodiment of the method said sending of the data of the first entity comprising the group data to the second database comprises the group data identifier.

According to an exemplary embodiment the method further comprises receiving, at the first database, an indication of a no-usage of the group data at the second database; and sending, in response to said reception of said indication, to the second database an instruction to delete the group data from the second database.

The sending and/or receiving of a no-usage message or indication may be an efficient way to inform another entity or network element, e.g. a further database, of the fact that specific data are not used anymore, so that the respective specific data may be deleted, therefore possibly reducing the necessary storage space.

According to an exemplary embodiment the method further comprises receiving, from the second database, an indication indicative for a deletion of the group data in the second database.

In particular, the first database may receive a specific message including the indication indicative of the deletion of the group data, wherein the message may be sent by the first database, for example. The sending and/or receiving of a deletion indication message may be useful for avoiding or at least reducing the frequency of sending group data updates to secondary or second databases which already deleted the respective group data or where this group data are not present anymore.

According to an exemplary embodiment of the method the first database keeps a list of second databases which provide said group data.

In particular, the list may be updated when the first database receives, e.g. from the second database, the indication indicative for a deletion of the group data in the second database. For example, such a list may be kept at the first database in the form of a table or a flags associated with the respective second databases. In particular, a flag associated with a second database may be set at the first database wherein the flag is indicative that the second database stores said group data. Alternatively, the list of second databases or serving nodes may be updated by deleting the second databases from the list of second databases when the first database is informed that no entity of the group is stored on said second database anymore.

According to an exemplary embodiment the method further comprises sending the updated group data to the second databases on the list.

In particular, the first database may firstly determine whether said group data has been updated. After it is determined that the group data has been updated the group data may only be sent to databases on the list. For example, the group data may only be sent to the second databases or serving nodes labeled or associated with a flag status indicative that the specific database still stores said group data. Thus, it may be possible to avoid that updated group data are sent to databases which does not store the respective group data. Therefore the amount of sent data may be reduced.

According to an exemplary embodiment of the method the group data is identified by a group data identifier and said receiving of the data of the first entity comprises the group data identifier and said receiving of the data of the second entity comprises the group data identifier.

In particular, the group data identifier identifies the belonging to a group, e.g. a group denoted as "group A".

According to an exemplary embodiment of the method the group data is obtained from the received data of the first entity based on a determination of the group data identifier comprised in the data of the first entity being the same as the group data identifier comprised in the data of the second entity.

As an example, when the second database recognizes (determines) that the group data identifiers of the data of the first entity and the second entity, e.g. device, subscriber or subscription, are the same, it recognizes (determines) that the group data of the first entity can be used also for the data of the second entity and can process accordingly to store the group data also for the data of the second entity.

According to an exemplary embodiment the method further comprises receiving an update of the group data; replacing the group data stored in the data of the first entity with the updated group data; and replacing the group data stored in the data of the second entity with the updated group data.

According to an exemplary embodiment the method further comprises determining no-usage for any of the data of the first entity and the second entity.

In particular, no-usage may be determined when the last device from the group is deleted from the second database. For example, no-usage may be no current and/or no future use. The no-usage may be determined by any suitable entity, e.g. the first database or the second database.

According to an exemplary embodiment the method further comprises if said determination of no-usage is in the affirmative, deleting the group data from the second database.

According to an exemplary embodiment the method further comprises sending an indication of the deletion to the first database.

In particular, such a sending of an indication may help to keep the databases on the same status. For example, the second database may send the indication to the first database, which then may delete the data as well or keep the data. However, in any case the first database does at least know that the respective deletion was performed at the second database.

According to an exemplary embodiment the method further comprises if said determination of no-usage is in the affirmative, sending an indication of the no-usage of the group data to the first database.

According to an exemplary embodiment the method further comprises receiving, in response to said sending of said indication, from the first database an instruction to delete the group data from the second database; and deleting the group data from the second database.

In general, the data of an entity, e.g. of an device, might be identified at the first database and/or the second database by an entity (e.g. device) data identifier, e.g. a first entity identifier might be associated to the data of the first entity and a second entity identifier to the data of the second entity. The first and second entity data identifier might be comprised in the request for the data of the first and second entity, respectively. The data of the first and the second entity comprises the group data. In addition it might comprise further entity specific data (e.g. denoted as D1indivData or "first device individual data" and D2indivData, as in the following described in the context of FIG. 2 or 5, or "second device individual data" for the first entity and the second entity, respectively, in some examples).

In that regard the sending of the data of the second entity without the group data might contain second entity specific data (e.g. denoted as D2indivData in some examples) or not, i.e. in the latter case the sending of the data of the second entity does not carry any device data with respect to the second entity at all. The sending might be in this case a response message to the earlier request with the response message carrying an empty data field for the data of the second entity.

Next, further exemplary embodiments of the first database, e.g. a global database or central database, are described. However, these embodiments also apply to the method for providing of data, the local or second database, the system, program elements, and to a computer readable medium.

According to an exemplary embodiment of the first database the storage unit is adapted to store data of a second entity, in particular a second device, the data of the second entity comprising the group data; the receiving unit is adapted to receive from the second database a request for the data of the second entity; and the processing unit is adapted to determine that the data of the second entity comprises the group data and that said group data has been sent to the second database before and if said determining step is in the affirmative, to initiate a sending via the transmission unit of the data of the second entity without the group data to the second database According to an exemplary embodiment of the first database the group data is identified by a group data identifier and said sending of the data of the second entity without the group data to the second database comprises the group data identifier.

According to an exemplary embodiment of the first database said sending of the data of the first entity comprising the group data to the second database comprises the group data identifier.

According to an exemplary embodiment of the first database the receiving unit being adapted to receive an indication of a no-usage of the group data at the second database and the transmission unit being adapted to send, in response to said reception of said indication, to the second database an instruction to delete the group data from the second database.

According to an exemplary embodiment of the first database the receiving unit being adapted to receive, from the second database, an indication indicative for a deletion of the group data in the second database.

According to an exemplary embodiment of the first database the first database being adapted to keep a list of second databases which provide said group data.

According to an exemplary embodiment of the first database the transmission unit being adapted to send the updated group data to the second databases on the list.

Next, further exemplary embodiments of the second database, e.g. a local database, are described. However, these embodiments also apply to the method for providing of data, the global or first database, the system, program elements, and to a computer readable medium.

According to an exemplary embodiment of the second database the group data is identified by a group data identifier and said receiving of the data of the first entity comprises the group data identifier and said receiving of the data of the second entity comprises the group data identifier.

In particular, the group data identifier identifies the belonging to a group, e.g. a group denoted as "group A".

According to an exemplary embodiment of the second database the processing unit is adapted to obtain the group data from the received data of the first entity based on a determination of the group data identifier comprised in the data of the first entity being the same as the group data identifier comprised in the data of the second entity.

As an example, when the processing unit of the second database recognizes (determines) that the group data identifiers of the data of the first and the second entity are the same, it recognizes (determines) that the group data of the first entity can be used also for the data of the second entity and can process accordingly to store the group data also for the data of the second entity.

According to an exemplary embodiment of the second database the receiving unit is adapted to receive an update of the group data; the processing unit is adapted to replace the group data stored in the data of the first entity with the updated group data; and the processing unit is adapted to replace the group data stored in the data of the second entity with the updated group data.

According to an exemplary embodiment of the second database the processing unit is adapted to determine no-usage for any of the data of the first and the second entity.

According to an exemplary embodiment of the second database if said determination of no-usage is in the affirmative, the processing unit is adapted to delete the group data from the storage unit of second database.

According to an exemplary embodiment of the second database the transmission unit is adapted to send an indication of the deletion to the first database.

According to an exemplary embodiment of the second database if said determination of no-usage is in the affirmative, the transmission unit is adapted to send an indication of the no-usage of the group data to the first database.

According to an exemplary embodiment of the second database the receiving unit is adapted to receive, in response to said sending of said indication, from the first database an instruction to delete the group data from the second database, and the processing unit is adapted to delete the group data from the storage unit of the second database.

At least some of the above described databases and methods may provide a great save of signaling resources when grouping high amount of entities, e.g. devices, with the same or similar profile data that access the same serving node. In particular, the databases and methods may facilitate efficient provision of data, for example of a mobile network.

In the following some principles of the databases and the methods according to exemplary embodiments are described while referring to the drawings.

Figure 1:
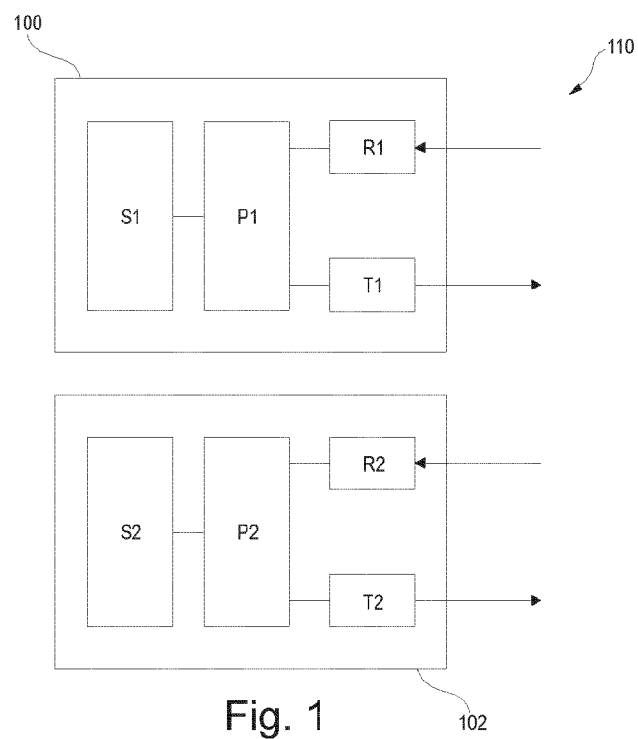
FIG. 1 schematically illustrates of a system according to an exemplary embodiment.

FIG. 1 schematically illustrates a system 110 comprising a first database 100 which may be a central database and a second database 102 which may be a local database.

The first database 100 comprises a first receiving unit R1 which is adapted to receive communication messages, like requests. The first receiving unit R1 is coupled to a first processing unit P1 which is in turn coupled to a first storage unit S1. Furthermore, the first processing unit P1 is coupled to a first transmission unit T1 which is adapted to transmit or send communication messages.

The second database 102 comprises a second receiving unit R2 which is adapted to receive communication messages, like requests. The second receiving unit R2 is coupled to a second processing unit P2 which is in turn coupled to a first storage unit S2. Furthermore, the first processing unit P2 is coupled to a first transmission unit T2 which is adapted to transmit or send communication messages.

Figure 2:
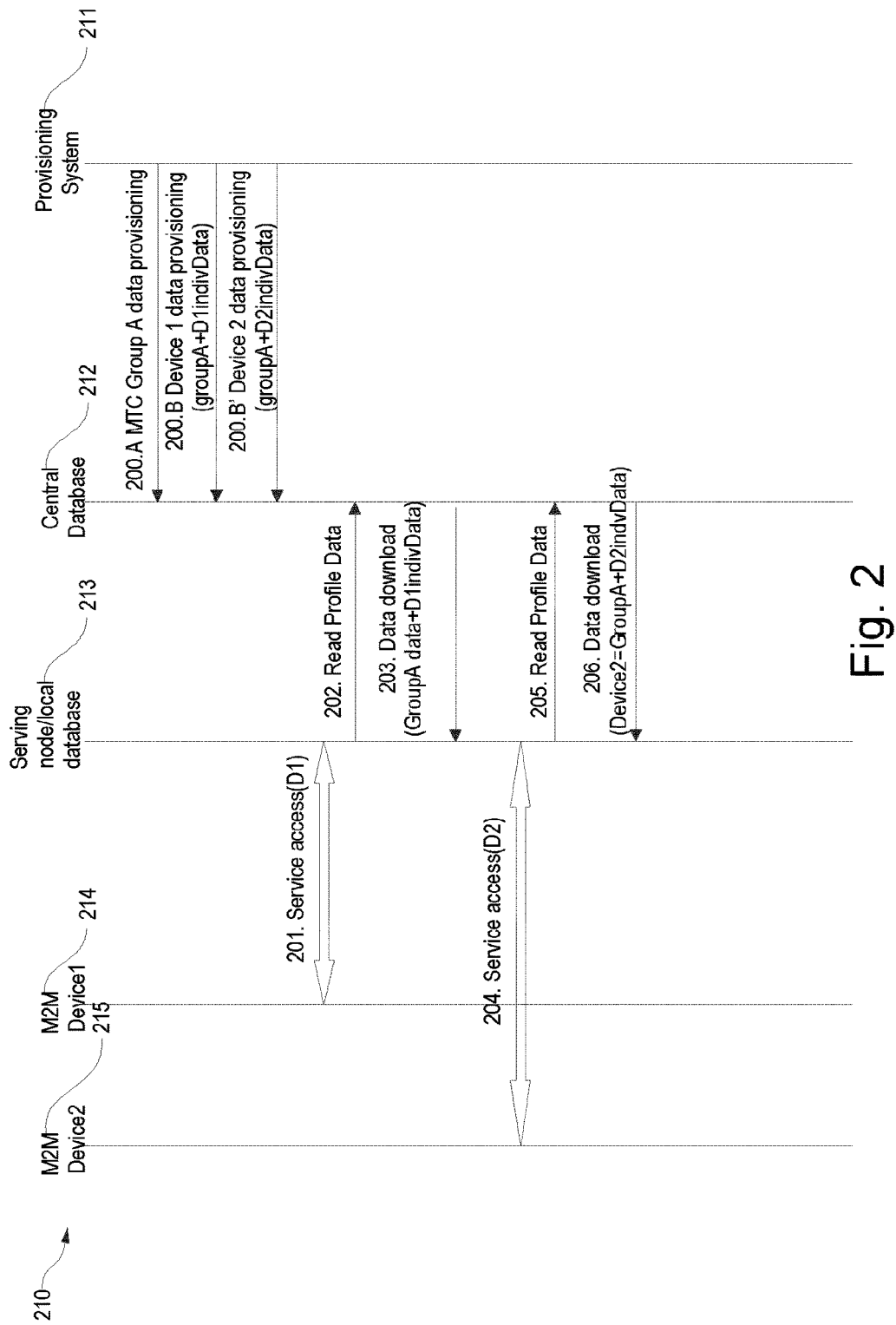
FIG. 2 schematically illustrates a method for device data download to a serving node.

FIG. 2 schematically illustrates a method for device data download to a serving node. In particular, FIG. 2 illustrates an embodiment referring to a (general) message flow, e.g. in a communication network 210 comprising a provisioning system 211, a central database 212, a serving node or local database 213, a first device 214, e.g. a mobile device (also denoted as "Device1" or "M2M" (Machine-to-Machine)), and a second device 215, e.g. a second mobile device (also denoted as "Device2" or "M2M" (Machine-to-Machine)). The first and second devices may be a mobile phone, laptop, PDA or the like.

In a first step (step 200.A) group A data, i.e. data relating to a first group A, is configured in central database. It is not needed to configure it in the local databases.

In next steps (step 200.B and step 200.B') profile data is provisioned in the central database for the first device 214 and the second device 215. Each of the provisioning 200.B and 200.B' could be in one step or in more than one step, e.g.

via several messages "200.B Device 1 data provisioning" and "200.B' Device 2 data provisioning" as e.g. depicted in FIG. 2. They are included in group A and individual data (if any) is added to each individual profile.

Thereafter, (step 201.) the first device 214 access a service (e.g. in the serving node) which needs profile data of the first device from its local database 213.

Then, (step 202.) the local database 213 requests profile data of the first device 214 to the central database 212. For example, initializing a read in the central database 212 or requesting for data of the first device 214.

In a next step (step 203.) the central database realizes that the first device 214 belongs to group A and that the requesting local database has not been populated with group A data before. Then, the central database downloads the group A data together with individual data (if any) of the first device 214 to the local database 213, that stores it.

Thereafter, (step 204.) the second device 215 may access a service (in the serving node) which needs profile data from its local database 213.

Then, (step 205.) the local database 213 requests profile data of the second device 215 to the central database 212. For example, initializing a read in the central database 212 or requesting for data of the second device 215.

In a following step (step 206.) the central database 212 realizes that the second device belongs to group A, i.e. the same group as the first device, and that this local database 213 has already been populated with group A data before. Then, the central database 212 downloads only individual data (if any) of the second device to the serving node 213 together with the set to group A for the device.

Figure 3:
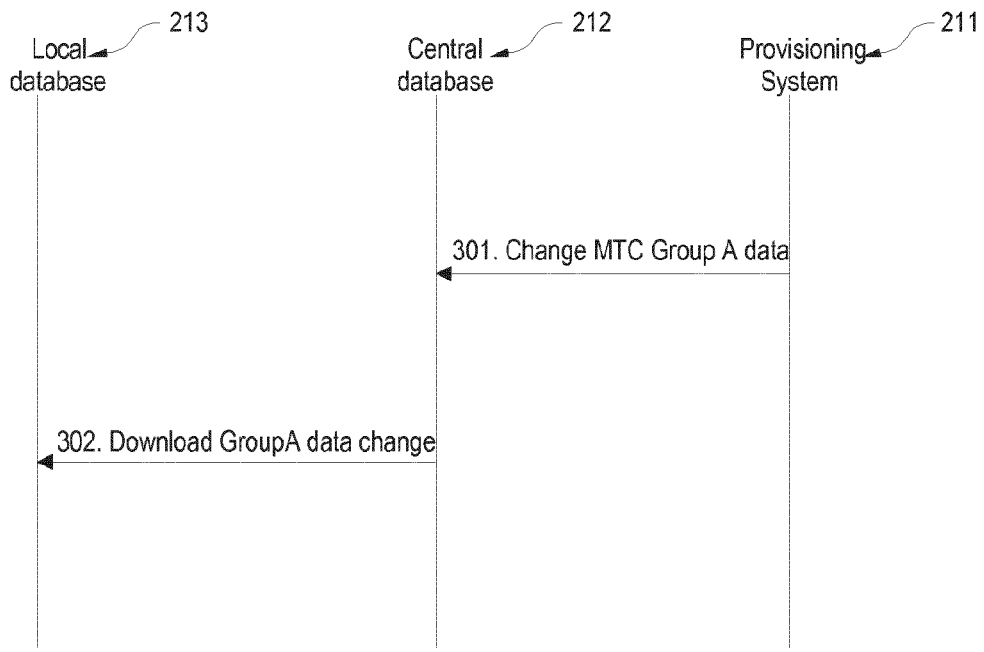
FIG. 3 schematically illustrates an updating of group data.

FIG. 3 schematically illustrates group data change population. In particular, FIG. 3 explains some principles of an embodiment of updating group data. For example, in case the provisioning system 211 would like to update group A data it may send a request for change of MTC group A data to the central database 212 (step 301.), so that the group A data is changed in central database 212. Afterwards (step 302.) group data change is sent to the local databases 213 where any device of this group is located. In particular, the data for all entities, e.g. devices, belonging to the same group are changed or updated. If there is a high amount of devices served by the same local database 213, there is a substantial saving of signaling.

Figure 4:
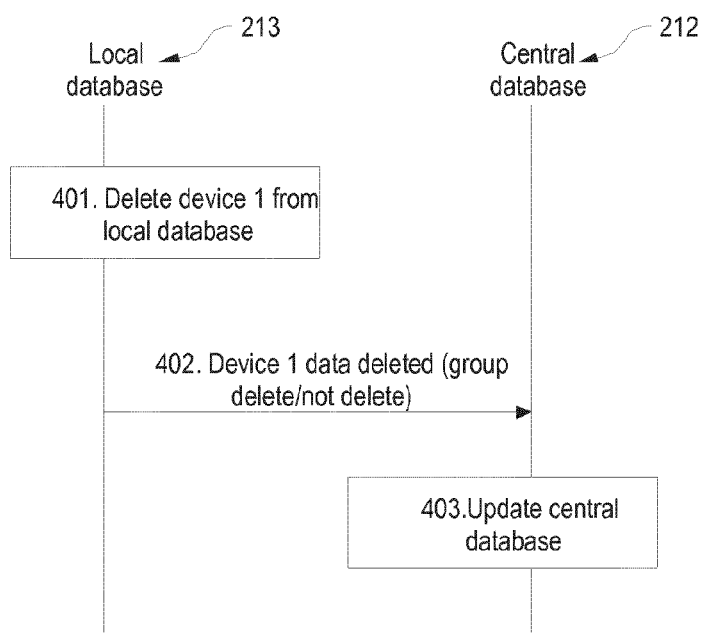
FIG. 4 schematically illustrates a deleting of group data from local database.

FIG. 4 schematically illustrates a deleting of group data from local database. Once the group data is stored in the local data base, it can be decided to permanent store it there or maybe there is a need to delete it when local data base do not need it any more (individual device data is deleted) and it needs storage space.

Two solutions are possible according to exemplary embodiments:
  Group data is deleted from local database when last device from this group is deleted from said local database. So, when any data of the group changes in central database, this local database does not need to be informed.
  Group data may be maintained after data from the last device from this group is deleted from local database. Then, the central database has to maintain updated the local databases with group information although there are no individuals from that group. The group data could be deleted later on if needed (e.g. data storage capacity needed) and the central database informed.

In the following principle steps of deleting of group data according to the first alternative is described. In a first step (step 401.) the local database 213 decides to delete data of the first device 214 as it does not needed any more. The first device 214 is the last group A member on this local database 213. In the following (step 402.) the local database 213 informs the central database 212 that data of the first device 214 has been deleted and if associated group A data has been deleted or not. For example, this may be performed by a no-usage message, indicated that the group A data has not been used for a predetermined time-span, for example. Afterwards (step 403.) central database updates its registers accordingly.

Figure 5:
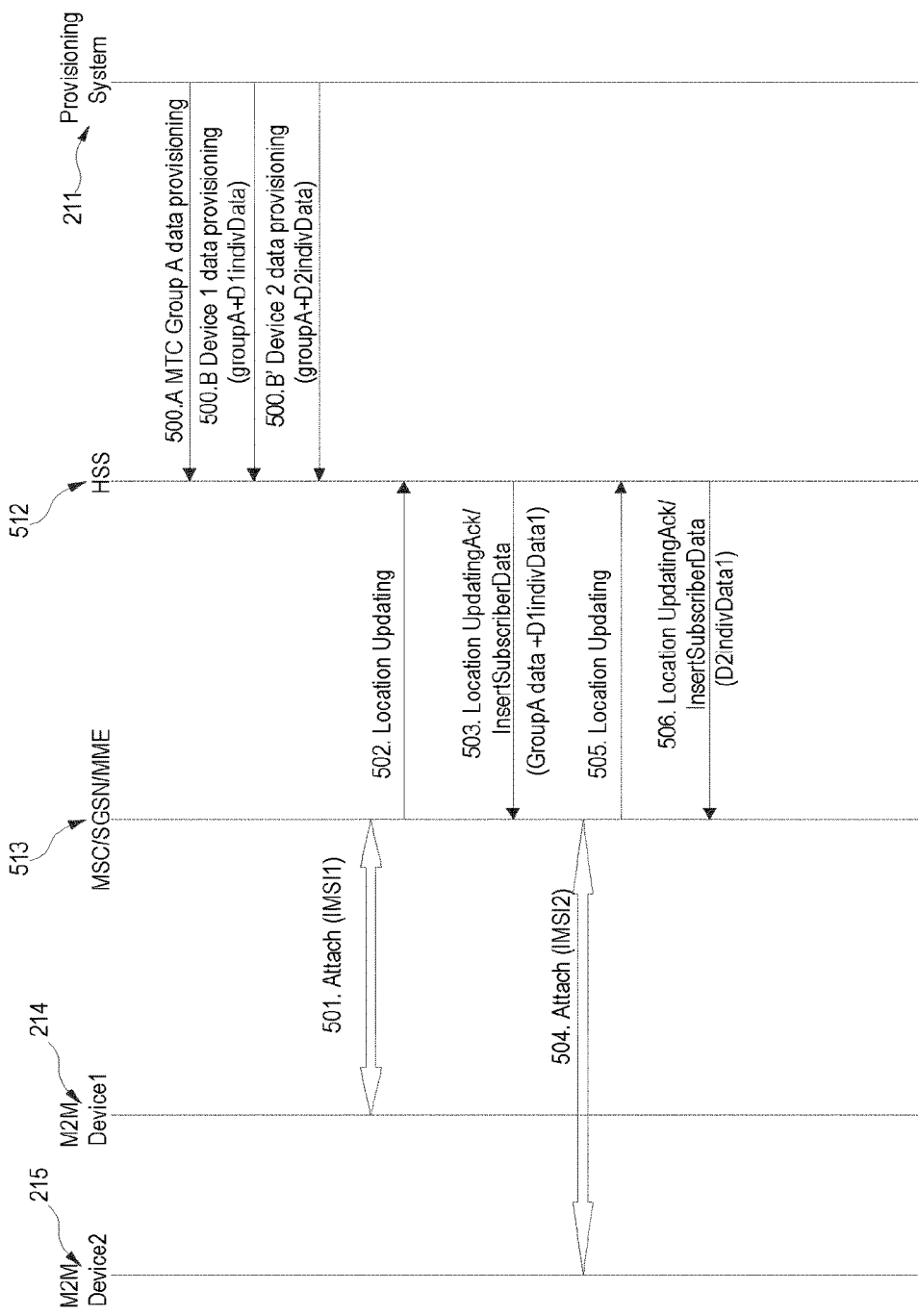
FIG. 5 schematically illustrates an embodiment referring to a 3GPP mobility management use case.

FIG. 5 schematically illustrates an embodiment referring to a 3GPP mobility management use case. In particular, FIG. 5 shows data download at an attach procedure in CS/GPRS/LTE access network, e.g. when a location update is performed. In this embodiment, an HSS 512 serves as an example for a central database and a MSC or SGSN or MME 513 serve as examples for a local database.

In the beginning (step 500.A) group A data is configured in HSS 512. It is not needed to configure it in the serving nodes (MSC/SGSN/MME 513).

In the following (steps 500.B and 500B') profile data is provisioned in the HSS 512, for the first device 214 and the second device 215, respectively. Each of the provisioning steps 500.B and 500.B' could be in one step or in more than one step, e.g. via several messages "500.B Device 1 data provisioning" and "500.B' Device 2 data provisioning" as e.g. depicted in FIG. 2. They are included in group A and individual data (if any) is added to each individual profile.

Afterwards (step 501.) the first device 214 access a service in the MSC/SGSN/MME 513 which needs profile data of the first device 214.

In a next step (step 502.) the serving node request profile data of the first device 214 to the HSS 512 during location updating procedure.

In the following (step 503.) the HSS 512 realizes that the first device 214 belongs to group A and that MSC/SGSN/MME 513 has not been populated with group A data before. Then, the HSS 512 downloads the group A data together with individual data (if any) of the first device 214 to the MSC/SGSN/MME 513, and stores it.

In a next step (step 504.) the second device 215 accesses a service in the MSC/SGSN/MME 513 which needs profile data of second device 215.

Afterwards (step 505.) the MSC/SGSN/MME 513 requests profile data of the second device 215 to HSS 512 during location updating procedure.

In the following (step 506.), the HSS 512 realizes that the second device 215 belongs to group A and that this MSC/SGSN/MME 513 has already been populated with group A data before. Then, the HSS downloads only individual data (if any) of the second device 215 to the MSC/SGSN/MME 513 together with the set to group A for the device.

Figure 6:
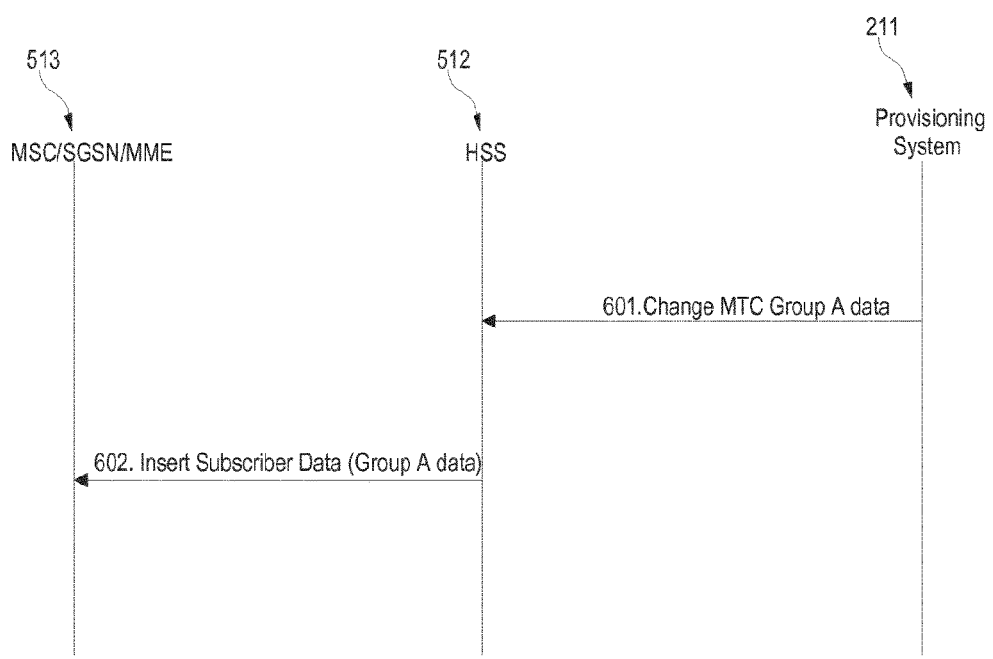
FIG. 6 schematically illustrates an embodiment of updating group data GPRS/LTE.

FIG. 6 schematically illustrates an embodiment of updating group data GPRS/LTE. In particular, FIG. 6 schematically illustrates group insert subscriber data. In a first step (step 601.) group A data is changed in HSS 512. Afterwards (step 602.) the HSS 512 sends one insert subscriber data to the MSC/SGSN/MME 513 where any device of this group is located. If there is a high amount of devices served by the same node, there is a substantial saving of signaling.

According to another exemplary embodiment a purging of group data can be performed. In such a purge group data embodiment the serving node informs the HSS by means of a purge message when it decides to delete subscriber data. If the serving node also deletes the corresponding group data (e.g. the last device from the group is deleted) the HSS is also informed. This can be done in the same message, for example.

If the group data is not deleted in this moment but it is decided to be deleted later on (e.g. storage capacity is needed), when no devices of the group are stored in this serving node, then the HSS shall also be informed, e.g. by means of a group-purge message, so the HSS can update the list of serving nodes with such group data provided. So, when data group change in HSS, this serving node does not need to be informed.

Other examples of central/local databases where this invention could be applied are:
  HSS as central IP Multimedia Subsystem (IMS) database and Serving Call State Control Functions (S-CSCFs) as local databases.
  Centralized User Database (CUDB) and Front Ends (FEs) in layer architecture.

Beside the above described the further embodiments may be provided in which the methods and/or databases are further adapted to establish a mechanism to solve prevalence and interactions between individual and group data:
  Preferably, the central database sends data to local databases so there are no interactions/inconsistencies between them.
  If this is not possible, it is indicated at data download if individual data has preference over group data or vice versa.
  If the device forms part of several groups, the central database indicates the prevalence of one group to the other for the whole set of data or one by one.

Furthermore, it should be mentioned that all described embodiments described in this application can be combined. Thus, group profile/individual profile interaction embodiments may be combined.

The invention may be applied in a Global System for Mobile Communications (GSM), General Packet Radio Service (GPRS), Universal Mobile Telecommunications System (UMTS), Long Term Evolution (LTE) or any future (5G=5$^{th}$ generation) mobile communication system or combinations thereof. It might be further applied, alternatively or in addition, in wired communication systems.

It should be noted that the term "comprising" does not exclude other elements or features and the "a" or "an" does not exclude a plurality. Also elements described in association with different embodiments may be combined. It should also be noted that reference signs in the claims shall not be construed as limiting the scope of the claims.

The invention claimed is:

1. A method for providing of data, wherein the method is provided at a first database having at least one communication interface, the method comprising:
  providing group data;
  providing data of a first entity and data of a second entity, the data of the first entity comprising individual data specific for the first entity and the group data, the data of the second entity comprising individual data specific for the second entity and the group data, the first entity comprising a first wireless machine to machine (M2M) device and the second entity comprising a second wireless M2M device, wherein the group data comprises data relating to or associated with a group of wireless M2M devices including the first wireless M2M device and the second wireless M2M device and/or data relating to the configuration of the group of wireless M2M devices, wherein the individual data specific to the first entity device comprises data specific to the first wireless M2M device and the individual data specific to the second entity comprises data specific to the second wireless M2M device;
  receiving, via the at least one communication interface, a request for the data of the first entity transmitted from a second database;
  determining that the data of the first entity comprises the group data and that said group data has not been previously sent to the second database;
  responsive to determining that the data of the first entity comprises the group data and that said group data has not been previously sent to the second database, transmitting, via the at least one communication interface, the data of the first entity comprising the individual data specific to the first wireless M2M device and the group data to the second database;
  receiving, via the at least one communication interface, a request for the data of the second entity transmitted from the second database;
  determining whether the data of the second entity comprises the group data and that said group data has been previously transmitted to the second database; and
  responsive to determining that the data of the second entity comprises the group data and that said group data has been previously transmitted to the second database, transmitting, via the at least one communication interface, the data of the second entity comprising the individual data specific to the second wireless M2M device without the group data to the second database.

2. The method according to claim 1, wherein the group data is identified by a group data identifier and
  said transmitting of the data of the first entity comprising the individual data specific for the first entity and the group data to the second database comprises the individual data specific for the first entity and the group data identifier and/or
  said transmitting of the data of the second entity comprising the individual data specific for the second entity without the group data to the second database comprises transmitting the individual data for the second entity and the group data identifier.

3. The method according to claim 1, further comprising:
  receiving, at the first database via the at least one communication interface, an indication of a no-usage of the group data at the second database; and
  transmitting, in response to said reception of said indication via the at least one communication interface, to the second database an instruction to delete the group data from the second database.

4. The method according to claim 1, further comprising:
  receiving, from the second database via the at least one communication interface, an indication indicative for a deletion of the group data in the second database.

5. The method according to claim 1, wherein the first database keeps a list of second databases which provide said group data.

6. The method according to claim 5, further comprising:
  transmitting, via the at least one communication interface, the updated group data to the second databases on the list.

7. The method according to claim 1 wherein the group data comprises 3GPP profile data relating to or associated with the group of wireless M2M devices including the first wireless M2M device and the second wireless M2M device and/or data relating to the configuration of the group of wireless M2M devices, wherein the individual data specific to the first entity device comprises 3GPP profile data specific to the first wireless M2M device and the individual data specific to the second entity comprises 3GPP profile data specific to the second wireless M2M device, wherein the first database comprises a central database comprising a home subscriber server (HSS) and the second database comprises a local database comprising one of a mobile switching center (MSC), a serving GPRS support node (SGSN) and a mobile management entity (MME).

8. A method for providing of data, wherein the method is provided at a second database having at least one communication interface, and a storage unit, the method comprising:
 transmitting, via the at least one communication interface, a request for data of a first entity comprising a first wireless machine to machine (M2M) device to a first database;
 receiving from the first database, via the at least one communication interface, the data of the first entity comprising individual data specific for the first entity and group data wherein the group data comprises data relating to or associated with a group of wireless M2M devices including the first wireless M2M device and a second wireless M2M device and/or data relating to the configuration of the group of wireless M2M devices, wherein the individual data specific to the first entity device comprises data specific to the first wireless M2M device;
 storing, in the storage unit, the data of the first entity comprising the individual data specific for the first entity and the group data;
 transmitting, via the communication interface, a request for data of a second entity comprising a second wireless M2M device to the first database;
 receiving from the first database, via the at least one communication interface, the data of the second entity comprising individual data specific for the second entity without the group data, wherein the individual data specific to the second entity comprises data specific to the second wireless M2M device;
 obtaining the group data from the received data of the first entity; and
 storing the data of the second entity comprising the individual data specific for the second entity and the group data with the group data obtained from the received data of the first entity.

9. The method according to claim 8, wherein the group data is identified by a group data identifier and said receiving of the group data of the first entity comprises receiving the group data identifier and said receiving of the group data of the second entity comprises receiving the group data identifier.

10. The method according to claim 9, wherein the group data is obtained from the received data of the first entity based on a determination of the group data identifier comprised in the data of the first entity being the same as the group data identifier comprised in the data of the second entity.

11. The method according to claim 8, further comprising:
 receiving, via the at least one communication interface, an update of the group data;
 replacing the group data stored in the data of the first entity with the updated group data; and
 replacing the group data stored in the data of the second entity with the updated group data.

12. The method according to claim 8, further comprising: determining no-usage for any of the data of the first entity and the second entity.

13. The method according to claim 12, further comprising:
 responsive to said determination of no-usage being in the affirmative, deleting the group data from the second database.

14. The method according to claim 13, further comprising:
 transmitting, via the at least one communication interface, an indication of the deletion to the first database.

15. The method according to claim 12, further comprising:
 responsive to said determination of no-usage being in the affirmative, sending an indication of the no-usage of the group data to the first database.

16. The method according to claim 15, further comprising:
 receiving via the at least one communication interface, in response to said transmitting of said indication, from the first database an instruction to delete the group data from the second database; and
 deleting the group data from the second database.

17. The method according to claim 8 wherein the group data comprises 3GPP profile data relating to or associated with a group of wireless M2M devices including the first wireless M2M device and the second wireless M2M device and/or data relating to the configuration of the group of wireless M2M devices, wherein the individual data specific to the first entity device comprises 3GPP profile data specific to the first wireless M2M device and the individual data specific to the second entity comprises 3GPP profile data specific to the second wireless M2M device, wherein the first database comprises a central database comprising a home subscriber server (HSS) and the second database comprises a local database comprising one of a mobile switching center (MSC), a serving GPRS support node (SGSN) and a mobile management entity (MME).

18. A first database comprising a receiving unit, a transmission unit, a processing unit, and a storage unit, wherein:
 the storage unit is adapted to store group data and data of a first entity comprising a first wireless machine to machine (M2M) device and data of a second entity comprising a second wireless M2M device, the data of the first entity comprising the group data and individual data specific for the first entity, the individual data specific to the first entity device comprising data specific to the first wireless M2M device, the data of the second entity comprising the group data and individual data specific for the second entity, the individual data specific to the second entity comprises data specific to the second wireless M2M device and the group data comprising data relating to or associated with a group of wireless M2M devices including the first wireless M2M device and the second wireless M2M device and/or data relating to the configuration of the group of wireless M2M devices;
 the receiving unit is adapted to receive a request for the data of the first entity transmitted from a second database;
 the processing unit is adapted to determine that the data of the first entity comprises the group data and that said group data has not been previously sent to the second database and responsive to determining that the data of the first entity comprises the group data and that said group data has not been previously sent to the second database, transmit via the transmission unit of the data of the first entity comprising the individual data specific to the first wireless M2M device and the group data to the second database;

the receiving unit is adapted to receive a request for the data of the second entity transmitted from the second database; and the processing unit is adapted to determine that the data of the second entity comprises the group data and individual data specific for the second unit and whether said group data has been previously sent to the second database and responsive to determining that the data of the second entity comprises the group data and that the group data has been previously transmitted to the second database, transmit, via the transmission unit, the individual data specific to the second wireless M2M device without the group data to the second database.

19. The first database according to claim 18 wherein the group data comprises 3GPP profile data relating to or associated with a group of wireless M2M devices including the first wireless M2M device and the second wireless M2M device and/or data relating to the configuration of the group of wireless M2M devices, wherein the individual data specific to the first entity device comprises 3GPP profile data specific to the first wireless M2M device and the individual data specific to the second entity comprises 3GPP profile data specific to the second wireless M2M device, wherein the first database comprises a central database comprising a home subscriber server (HSS) and the second database comprises a local database comprising one of a mobile switching center (MSC), a serving GPRS support node (SGSN) and a mobile management entity (MME).

20. A second database comprising a receiving unit, a transmission unit, a processing unit, and a storage unit, wherein:

the transmission unit is adapted to transmit to a first database a request for data of a first entity comprising a first wireless machine to machine (M2M) device, the first database storing data of the first entity and a second entity;

the receiving unit is adapted to receive from the first database the data of the first entity comprising group data and individual data specific for the first entity wherein the individual data specific for the first entity device comprises data specific to the first wireless M2M device;

the storage unit is adapted to store the data of the first entity comprising the group data and the individual data specific for the first entity;

the transmission unit is adapted to transmit to the first database a request for data of the second entity, the second entity comprising a second wireless M2M device, the data of the second entity comprising the group data and individual data specific for the second wireless device;

the receiving unit is adapted to receive from the first database the data of the second entity without the group data;

the processing unit is adapted to obtain the group data from the received data of the first entity; and the storage unit is adapted to store the data of the second entity comprising the group data obtained from the received data of the first entity and the individual data specific for the second entity wherein the individual data specific for the second entity comprises data specific to the second wireless M2M device.

21. The second database according to claim 20 wherein the group data comprises 3GPP profile data relating to or associated with a group of wireless M2M devices including the first wireless M2M device and the second wireless M2M device and/or data relating to the configuration of the group of wireless M2M devices, wherein the individual data specific to the first entity device comprises 3GPP profile data specific to the first wireless M2M device and the individual data specific to the second entity comprises 3GPP profile data specific to the second wireless M2M device, wherein the first database comprises a central database comprising a home subscriber server (HSS) and the second database comprises a local database comprising one of a mobile switching center (MSC), a serving GPRS support node (SGSN) and a mobile management entity (MME).

* * * * *